April 21, 1936.  O. E. DUDLEY  2,038,101
VIBRATION DETECTOR
Filed Feb. 18, 1931  2 Sheets-Sheet 1

INVENTOR
OSCAR E. DUDLEY
BY  ATTORNEY

April 21, 1936.                O. E. DUDLEY                2,038,101
                            VIBRATION DETECTOR
                           Filed Feb. 18, 1931              2 Sheets-Sheet 2

INVENTOR
Oscar E. Dudley
BY          ATTORNEY

Patented Apr. 21, 1936

2,038,101

UNITED STATES PATENT OFFICE 2,038,101

VIBRATION DETECTOR

Oscar E. Dudley, Houston, Tex., assignor to The Texas Company, New York, N. Y., a corporation of Delaware Application February 18, 1931, Serial No. 516,675

2 Claims. (Cl. 177—352)

This invention relates to vibration detectors, more particularly to devices for detecting sound or similar compressional waves coming through the air or through some solid medium, such as the earth.

Heretofore the majority of detectors designed for the above purpose have involved some sort of magneto electric constructions, i. e., one in which a variation of magnetic flux cutting across a coil or similar conductor is made to induce a current therein in response to a vibration. Detectors of this type have involved a relatively complicated construction and have been difficult to maintain in adjustment. Furthermore the currents induced by virtue of the sound or other compressional waves striking the detector have frequently been very feeble and have necessitated the use of cumbersome and expensive amplifying apparatus before being transmitted to a suitable indicating or recording device, such as a galvanometer or oscillograph.

A primary object of my invention has been to devise a suitable detector which is compact, relatively simple of construction and operation and readily adjustable. To this end the present invention contemplates the use of a sensitive and compact microphone, and structure for directing against the microphone small puffs of air generated in response to the reception of compressional waves. The microphone is to be connected in any suitable circuit which will give an indication of the changes in resistance of the microphone corresponding to the received compressional waves.

For a better understanding of the invention reference may be had to the accompanying description and drawings, in which Fig. 1 is a sectional elevation of a preferred embodiment of my invention.

Figure 1:
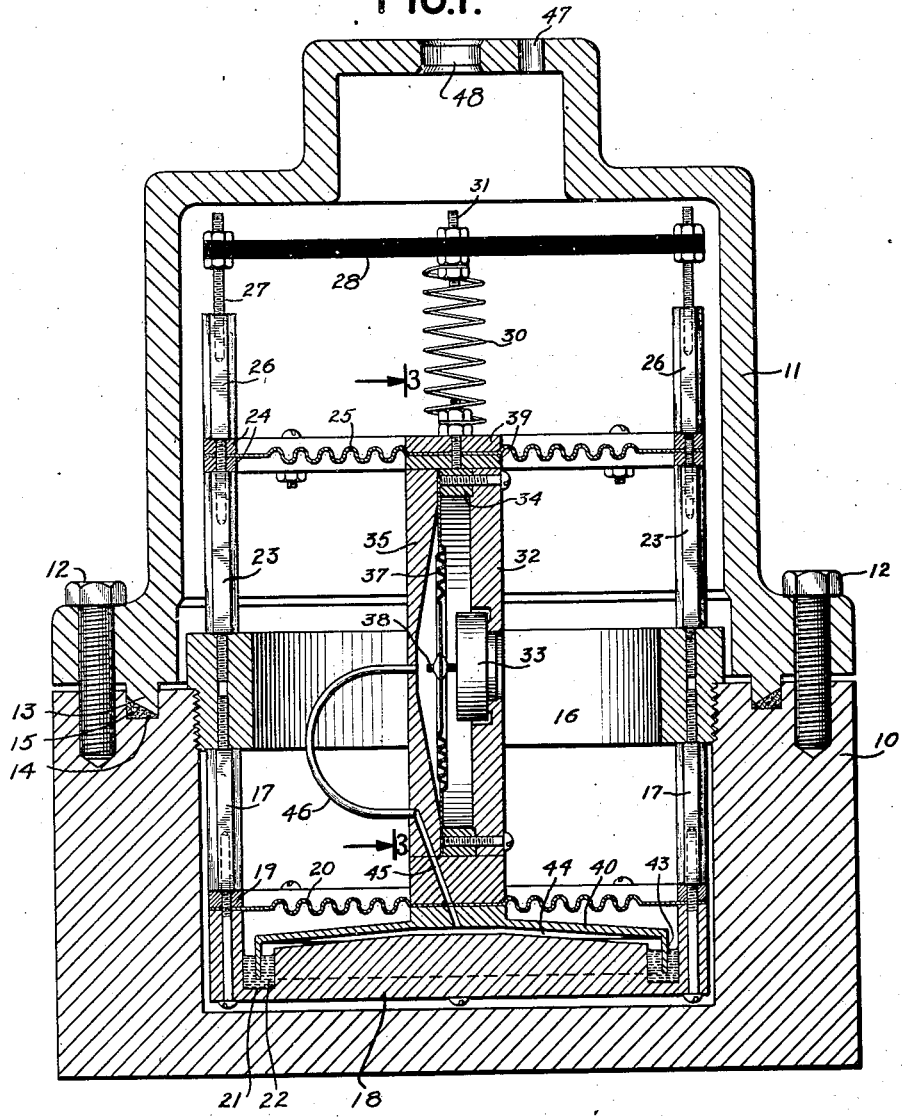
Figure 2:
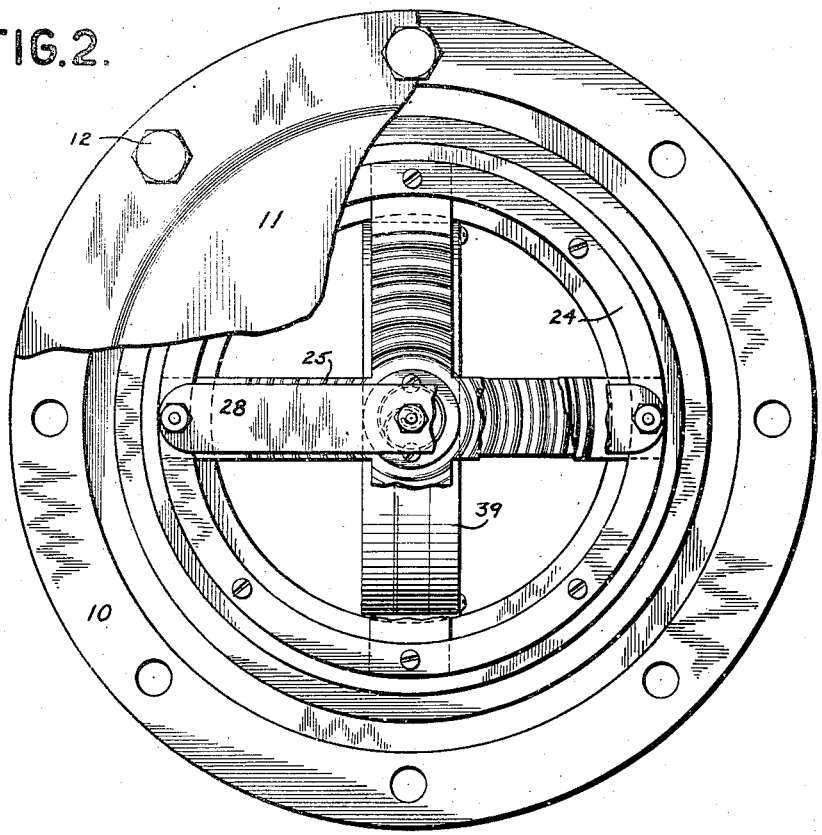
Fig. 2 is a top plan view with parts being broken away to better show the construction.

Referring to the drawings, I have shown my detector as being housed in a casing formed of a lower or base portion 10 and an upper or cover portion 11. This casing is adapted to be inserted or buried in the earth so as to make good contact therewith, in order that compressional wave vibrations, passing through the earth will cause the casing to vibrate in accordance with the duration and amplitude of the waves. The upper or cover portion 11 is adapted to be secured to the lower portion 10 by suitable means, such as the screws 12. An annular flange 13 is formed preferably integral with the lower surface of the casing portion 11 and a groove 14 formed in the upper surface of the casing portion 10 receives the projection 13. The groove 14 contains suitable packing 15 and thus, it will be seen that as the bolts 12 are tightened, a tight and moisture proof joint is obtained between the two casing portions.

An annular supporting ring 16 is threaded into the upper inner edge of the casing portion 10, this ring 16 serving to support the remaining parts of the detector. A plurality of legs 17 are rigidly secured to the lower surface of the supporting ring 16 and in turn serve to support a base member or wave responsive element 18. A clamping ring 19 is mounted between the base member 18 and the legs 17 and serves to hold the ends of a corrugated cross 20 preferably formed of leather or some similar material. The purpose of this cross will be explained hereinafter. The wave responsive element or base member 18 is provided with a groove 21 which serves to hold a quantity of a liquid 22, such as mercury.

To the upper surface of the supporting ring 16 is rigidly secured a plurality of legs 23 similar to the legs 17, the legs 23 acting as a support for a pair of clamping rings 24 between which is secured the ends of a second corrugated cross 25 similar to the cross 20. A third set of supporting legs 26 are adapted to be secured to the legs 23 and hold the clamping rings 24 and the cross 25 firmly in position. A pair of screws 27 are attached to the upper ends of two of the legs 26 and support a bar 28 of some suitable insulating material, such as a phenol condensation product. As will be seen with reference to Fig. 1, the bar 28 is adjustably mounted on the screws 27 so that it may be raised or lowered as desired.

Figure 3:
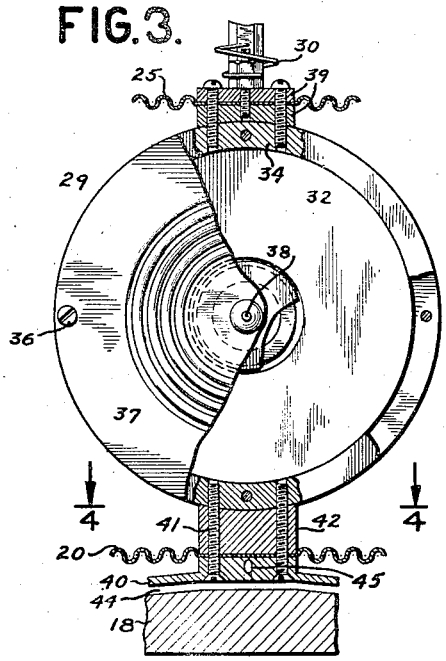
Fig. 3 is a sectional elevation of the microphone and its associated parts, the view being taken on line 3—3 of Fig. 1.
Figure 4:
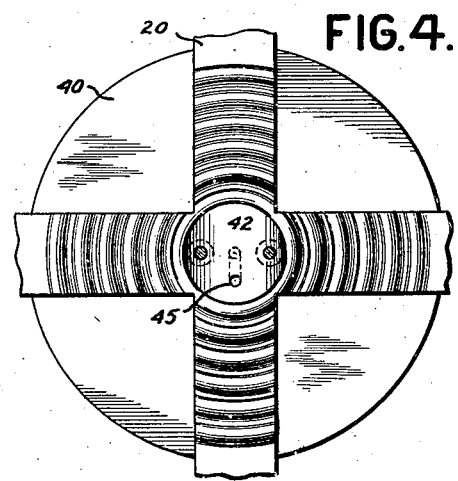
Fig. 4 is a plan of one of the supporting diaphragms, this view being taken in line 4—4 of Fig. 3.

The inertia element 29 shown in face view in Fig. 3 is yieldably suspended from a helical spring 30 which in turn is adjustably secured to the center of the bar 28 by means of a screw 31. The inertia element 29 comprises essentially a supporting disc 32 at the center of which is secured a suitable microphone 33 and a spacer ring 34 mounted at the edge of the disc 32. To this spacer ring is attached a diaphragm clamping member 35 by means of suitable screws 36. A corrugated diaphragm 37 is clamped between the spacer ring 34 and the member 35 and at the center of the diaphragm 37 is attached a small bolt 38 which is secured to the movable member, not shown, of the microphone 33. A pair of spacing clamps 39 are attached to the upper surface of the spacer ring 34 and serve both as a means for attaching the lower end of the spring 30 and as a means for clamping the middle portion of the upper corrugated cross 25. The purpose of the cross 25 is to yieldably maintain the inertia element in mid position relative to the supporting ring 16.

To the lower surface of the spacer ring 34 is secured a bell shaped member 40 by means of a pair of screws 41 passing through a spacer 42. The mid portion of the lower corrugated cross 20 is clamped between the spacer 42 and the bell member 40, thus yieldably maintaining the lower portion of the inertia element also in mid position with respect to the supporting ring 16. It is to be understood that in place of the corrugated crosses 20 and 25, a pair of relatively soft, leather diaphragms may also be used. The bell member 40 is provided with a depending flange 43 which is normally partially immersed in the liquid 22. An air chamber 44 is thus formed between the bell 40 and the base or wave responsive element 18, the liquid 22 serving as a seal for the outer portion of the air chamber. The air chamber 44 is provided with an outlet duct 45 at the upper end of which is mounted a conduit 46 which leads through the diaphragm clamping member 35 to a point directly in front of and in close proximity to the center of the microphone diaphragm 37.

It is intended that suitable electrical connecting leads, not shown, are to be attached to the microphone 33 and these leads will pass upwardly and through an opening 47 provided in the upper casing portion 11. If desired, suitable binding posts may be mounted on the insulating bar 28 and the leads from the microphone may be secured to such binding posts. An opening 48 is provided in the center of the upper casing portion 11, this opening serving to allow the passage of a small tool, such as a wrench, to be used in adjusting the position of the screw 31 and the tension of the spring 30.

In the operation of the detector, sound or other compressional waves passing through the earth will cause the casing, and consequently the supporting ring 16 and the wave responsive element 18 to vibrate in synchronism with the waves. The inertia element 29 being yieldably supported from the spring 30 will remain substantially stationary and it will be seen that the size of the air chamber 44 will vary in accordance with the relative movement between the bell 40 and the wave responsive element or base member 18 caused by the vibration of the wave responsive element by the compressional waves. As the volume of the air chamber 44 fluctuates, puffs of air will pass through the outlet 45 and conduit 46 and will impinge on the microphone diaphragm 37. The electrical resistance of the microphone will consequently vary in response to these puffs of air and suitable apparatus, which may be attached to the microphone leads, will serve to indicate or record these variations in resistance and thus the amplitude and duration of the compressional wave vibrations.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

I claim:

1. In a device of the class described, a housing responsive to compressional wave vibrations, a supporting base rigidly secured to and within said housing, an inertia member resiliently supported from said housing, a portion of said inertia member including an air chamber, a diaphragm closing one side of said air chamber, a microphone connected so as to be actuated by movement of said diaphragm, means including said supporting base and said inertia member forming a second expansible air chamber, and a conduit connecting said second air chamber with the air chamber in said inertia element, the arrangement being such that the output of said conduit caused by fluctuations in the volume of said second air chamber will be delivered within said first mentioned chamber against said diaphragm so that said diaphragm will be vibrated in accordance with said fluctuations.

2. In a detector, a casing responsive to compressional wave vibrations, a supporting ring mounted in said casing, a base member rigidly secured to said ring, an inertia element yieldably suspended from said ring, means including said inertia element and said base member forming an expansible air chamber, a microphone mounted on said inertia element, a diaphragm connected to said microphone, a member forming with said diaphragm a second enclosed chamber, and a conduit leading from said first mentioned chamber, the other end of said conduit opening into said second chamber so that fluctuations in the volume of said first mentioned chamber will cause puffs of air to pass through said conduit into said second chamber to actuate said diaphragm and said microphone.

OSCAR E. DUDLEY.